(12) United States Patent
Kikuchi et al.

(10) Patent No.: US 7,820,315 B2
(45) Date of Patent: Oct. 26, 2010

(54) FUEL CELL STACK HAVING COOLANT PASSAGE WHOSE LOWER AREA HAS LARGER FLOW RESISTANCE

(75) Inventors: Hideaki Kikuchi, Kawachi-gun (JP);
Masaru Oda, Utsunomiya (JP);
Teruyuki Otani, Haga-gun (JP);
Norimasa Kawagoe, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 121 days.

(21) Appl. No.: 11/599,938

(22) Filed: Nov. 14, 2006

(65) Prior Publication Data

US 2007/0117004 A1    May 24, 2007

(30) Foreign Application Priority Data

Nov. 16, 2005  (JP) .............................. 2005-331232

(51) Int. Cl.
*H01M 2/14* (2006.01)
(52) U.S. Cl. ............................. 429/38; 429/34; 429/39
(58) Field of Classification Search .................. 429/34, 429/38, 39
See application file for complete search history.

(56) References Cited

U.S. PATENT DOCUMENTS

| 5,547,776 | A | 8/1996 | Fletcher et al. | |
| 2003/0203260 | A1* | 10/2003 | Lee | 429/26 |
| 2003/0215695 | A1* | 11/2003 | Suzuki et al. | 429/38 |

FOREIGN PATENT DOCUMENTS

| JP | 5-144451 | 6/1993 |
| JP | 6-251778 | 9/1994 |
| JP | 7-122280 | 5/1995 |
| JP | 07-320755 | 12/1995 |
| JP | 2000-223137 | 8/2000 |
| JP | 2002-75416 | 3/2002 |
| JP | 2003-338300 | 11/2003 |

OTHER PUBLICATIONS

Japanese Office Action for Application No. 2005-331232, dated Aug. 17, 2010.

* cited by examiner

*Primary Examiner*—Dah-Wei Yuan
*Assistant Examiner*—Ben Lewis
(74) *Attorney, Agent, or Firm*—Lahive & Cockfield, LLP; Anthony A. Laurentano, Esq.

(57) ABSTRACT

A fuel cell stack having stacked unit fuel cells, each having a pair of separators between which a membrane electrode assembly is provided, which includes an anode and a cathode. Each separator has protruding lines arranged vertically in a zigzag manner, which protrude in a direction going away from the membrane electrode assembly. A space between the anode and the protruding lines of the separator facing the anode is used as a fuel gas passage. A space between the cathode and the protruding lines of the separator facing the cathode is used as an oxidant gas passage. At least part of the separators are each arranged in close contact with another separator so that a coolant passage through which a coolant flows horizontally is formed between both separators. A lower area of the coolant passage has a larger flow resistance than that of an upper area thereof.

4 Claims, 8 Drawing Sheets

FUEL CELL STACK HAVING COOLANT PASSAGE WHOSE LOWER AREA HAS LARGER FLOW RESISTANCE

BACKGROUND OF THE INVENTION

1. Field of the Invention

The present invention relates to a fuel cell stack formed by stacking a plurality of unit fuel cells.

Priority is claimed on Japanese Patent Application No. 2005-331232, filed Nov. 16, 2005, the content of which is incorporated herein by reference.

2. Description of the Related Art

In a known fuel cell, an anode and a cathode are provided on either side of a solid polymer electrolyte membrane so as to form a membrane electrode assembly. The membrane electrode assembly is placed between a pair of separators, thereby forming a unit fuel cell (called a "unit cell" below) having a plate shape. Generally, a specific number of unit cells are stacked so as to form a fuel cell stack.

In this fuel cell, hydrogen ions generated at the anode by catalytic reaction move through the solid polymer electrolyte membrane to the cathode, and an electrochemical reaction occurs between the hydrogen ions and oxygen at the cathode, thereby generating electric power. In this process, water is also generated (which is called "generated water" below). This reaction proceeds along the flow of reaction gases, from the upstream side to the downstream side. In addition, electric power generation also generates heat; thus, the fuel cell is generally cooled using a coolant flowing through the fuel cell, so as to continue the power generation.

In an example of a coolant passage, each separator having protruding lines, each line winding like waves, is formed by press-molding a metal plate, and is arranged in close contact with the anode or cathode of each membrane electrode assembly, so as to use the space between the protruding lines and the anode or cathode as a reaction gas passage (i.e., a fuel gas passage or an oxidant gas passage) and to use the space formed between adjacent separators as a coolant passage. In this case, the flow direction of each reaction gas is perpendicular to that of the coolant passage (see Japanese Unexamined Patent Application, First Publication No. 2003-338300).

As shown in FIG. 8, when the reaction gas is made to flow from the upper side to the lower side of a fuel cell stack S, that is, downward in the vertical direction (or the gravitational direction), the above-described reaction proceeds from the upper side toward the lower side, and water generated during the reaction also flows from the upper side toward the lower side. Therefore, the relative humidity in each reaction gas passage is higher at the lower side in comparison with the upper side.

When such a difference in humidity occurs in the fuel cell stack, the electric power generation cannot be performed uniformly.

SUMMARY OF THE INVENTION

In light of the above circumstances, an object of the present invention is to provide a fuel cell stack having a substantially uniform relative humidity in the membrane electrode assembly.

Therefore, the present invention provides a fuel cell stack (e.g., a fuel cell stack S in an embodiment explained later) comprising a plurality of stacked unit fuel cells (e.g., unit (fuel) cells 10 in the embodiment), wherein:

each unit fuel cell has:
a membrane electrode assembly (e.g., a membrane electrode assembly 20 in the embodiment) in which an anode (e.g., an anode 22 in the embodiment) and a cathode (e.g., a cathode 23 in the embodiment) interpose an electrolyte membrane (e.g., a solid polymer electrolyte membrane 21 in the embodiment); and
a pair of separators (e.g., separators 30A and 30B in the embodiment), each made of a metal plate, which respectively closely contact the anode and the cathode, wherein each separator has a plurality of protruding lines (e.g., protruding lines 31A and 31B in the embodiment) which are arranged vertically in a zigzag manner so as to draw a waveform, and which protrude in a direction going away from the membrane electrode assembly;

a space between the anode and the protruding lines of the separator which closely contacts this anode is used as a fuel gas passage (e.g., a fuel gas passage 51 in the embodiment) through which a fuel gas flows;

a space between the cathode and the protruding lines of the separator which closely contacts this cathode is used as an oxidant gas passage (e.g., an oxidant gas passage 52 in the embodiment) through which an oxidant gas flows;

at least part of the separators are each arranged in close contact with another separator so that a coolant passage (e.g., a cooling water passage 53 in the embodiment) through which a coolant flows horizontally is formed between both separators; and a lower area of the coolant passage has a larger flow resistance than that of an upper area of the coolant passage.

In accordance with the above structure, the amount of coolant flowing in the lower area of the coolant passage can be smaller than the amount of coolant flowing in the upper area thereof. Therefore, the lower portion of the fuel gas passage, the oxidant gas passage, and the membrane electrode assembly (called "the reaction gas passages and the like" below) can be less cooled in comparison with the upper portion, so that the temperature of the above lower portion which includes a larger amount of water can be higher than that of the above upper portion which includes a smaller amount of water. As a result, the relative humidity in the lower portion of the reaction gas passages and the like can be reduced and substantially equal to that in the upper portion thereof. Accordingly, it is possible to provide a substantially uniform relative humidity over the whole plane of the membrane electrode assembly, and electric power generation can be performed uniformly over the whole plane of the membrane electrode assembly, thereby performing stable power generation. In addition, it is possible to prevent the membrane electrode assembly from drying, and also to prevent the reaction gas passages from being closed or blocked due to the generated water.

In addition, as the lower area of the coolant passage has a larger flow resistance in comparison with the upper area, the flow resistance of the reaction gas passages is also larger in the lower area in comparison with the upper area. Therefore, the pressure of the reaction gases in the lower area can be reduced, and can be saturated partial pressure of water vapor or lower; thus, water (e.g., the generated water) existing in the reaction gas passages of the lower area can be vaporized and discharged from the reaction gas passages together with the reaction gases.

Typically, the lower area has a smaller pitch between waves of the waveform of the protruding lines than that of the upper area. Accordingly, the lower area of the coolant passage can have a larger flow resistance in comparison with the upper area thereof.

Preferably, the upper and lower areas each have an individual hole (e.g., cooling water supply holes 15a and 15b for the upper area and the cooling water supply holes 15c and 15d for the lower area in the embodiment) for supplying the coolant into the coolant passage and an individual hole (e.g., cooling water drainage holes 16a and 16b for the upper area and the cooling water drainage holes 16c and 16d for the lower area in the embodiment) for draining the coolant drawn from the coolant passage.

Accordingly, it is possible to reliably distribute the coolant to the upper and lower areas.

DETAILED DESCRIPTION OF THE INVENTION

Hereinafter, an embodiment of a fuel cell stack in accordance with the present invention will be described with reference to the appended FIGS. 1 to 8. A fuel cell stack "S" of this embodiment is used in a fuel cell automobile.

Figure 1:
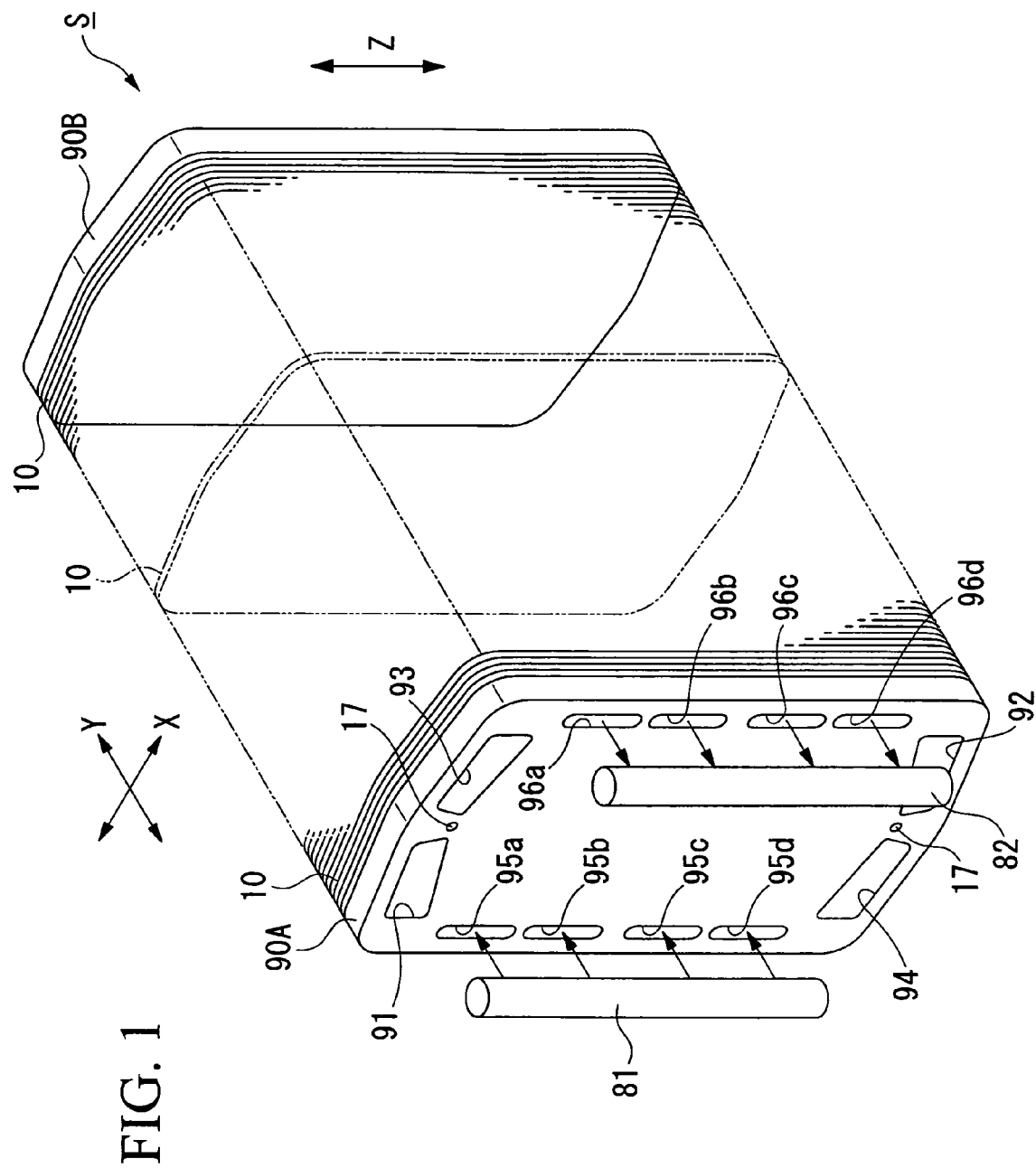
FIG. 1 is a general perspective view of the fuel cell stack as an embodiment in accordance with the present invention.

FIG. 1 is a general perspective view of the fuel cell stack S in which a number of unit fuel cells 10 (called "unit cells" below) are stacked and electrically connected in series, end plates 90A and 90B interpose the stacked body, and these elements are fastened together using tie rods (not shown). In each unit cell 10, longitudinal sides are longer than lateral sides. The fuel cell stack S of this embodiment is installed in the vehicle while the longitudinal sides thereof are arranged vertically (i.e., in the gravitational direction). In the appended figures, arrows X and Y indicate horizontal directions, and arrow Z indicates a vertical direction.

Figure 2:
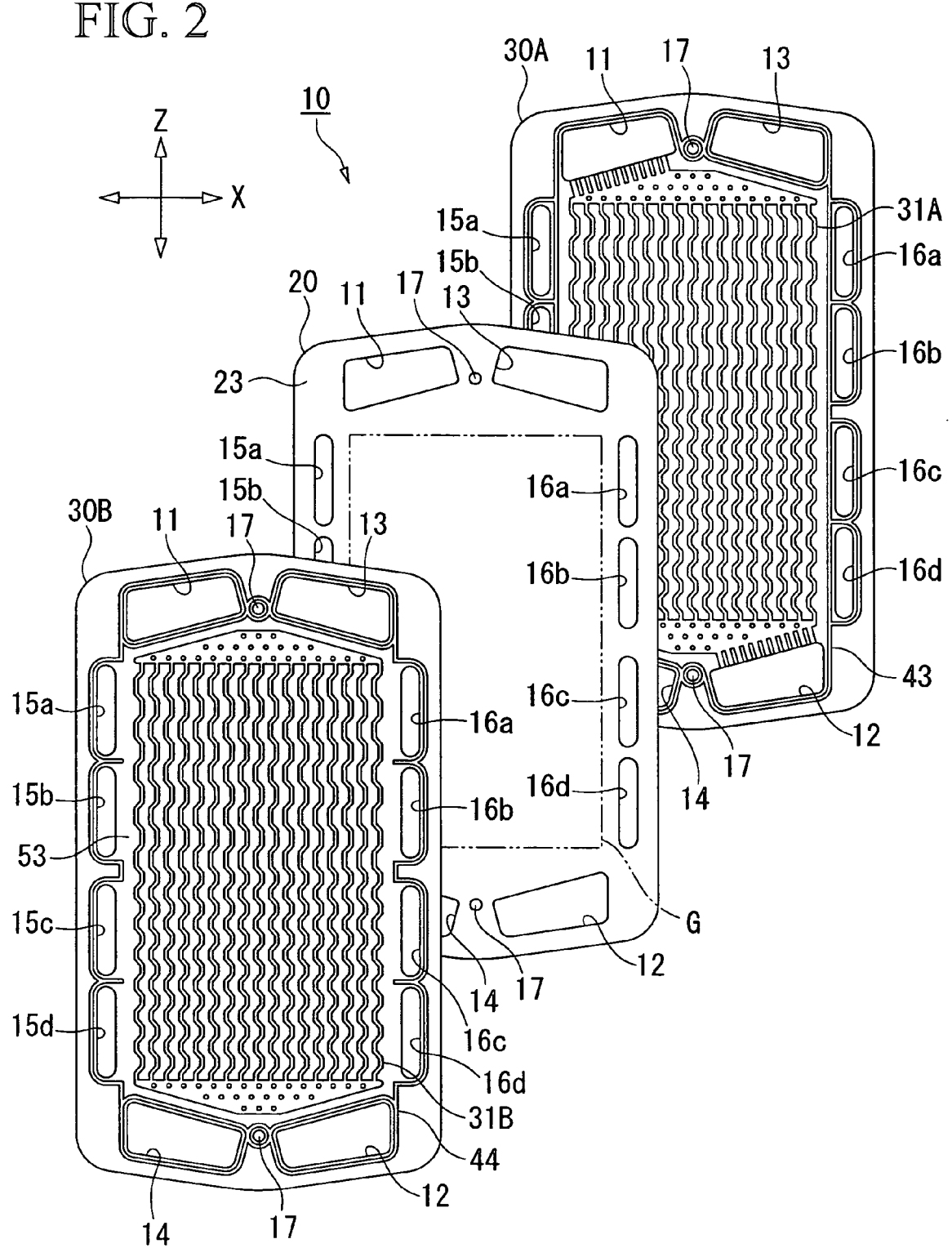
FIG. 2 is an exploded view of the unit fuel cell as a constituent of the fuel cell stack.
Figure 5:
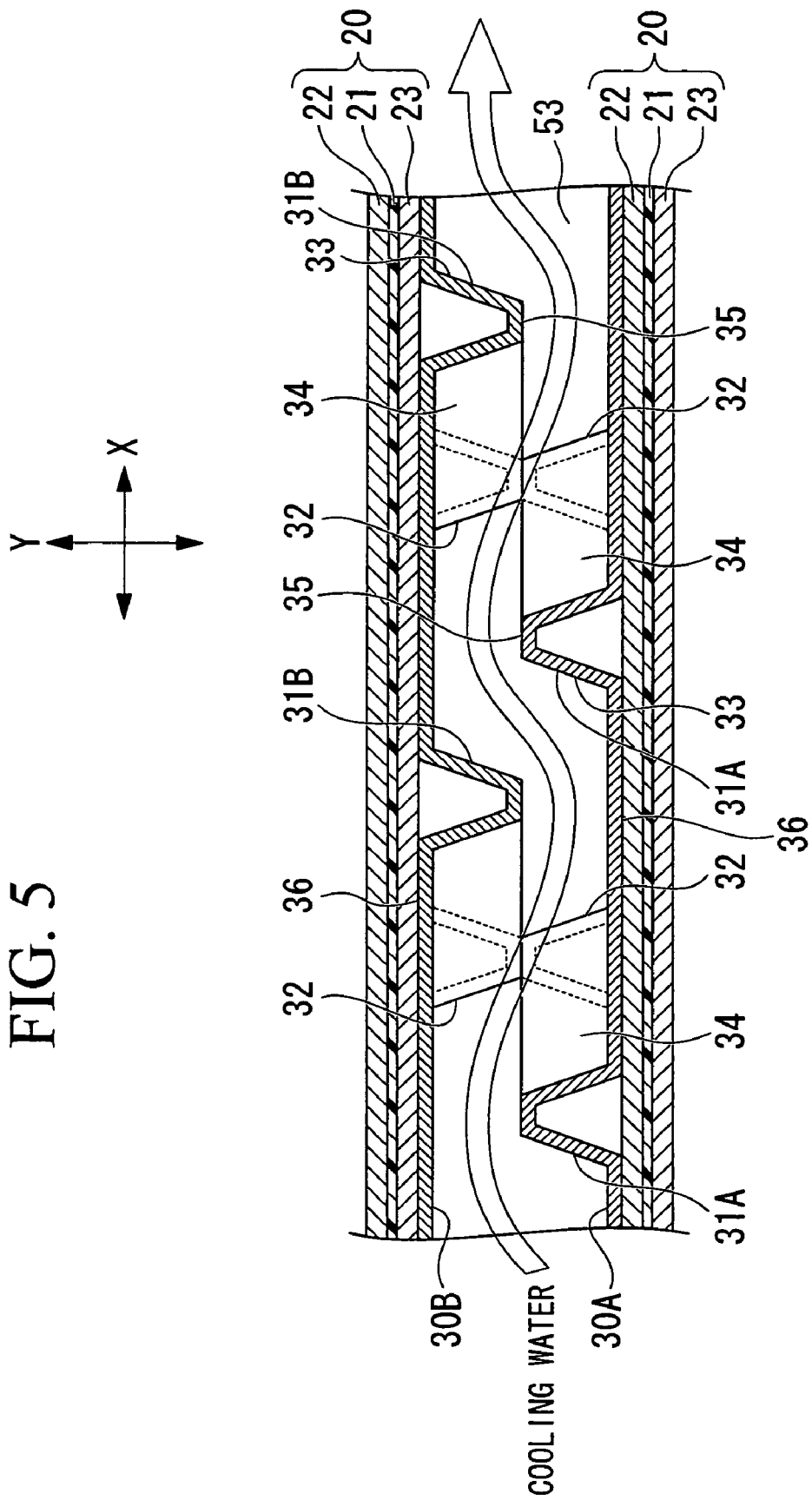
FIG. 5 is a partially sectional view of the fuel cell stack of the embodiment.

As shown in FIG. 2, each of the unit cells 10 has a sandwich structure in which a membrane electrode assembly 20 is provided between separators 30A and 30B. More specifically, as shown in FIG. 5, the membrane electrode assembly 20 has a solid polymer electrolyte membrane 21 (made of a fluorine electrolyte material or the like) provided between an anode 22 and a cathode 23, and the anode separator 30A and the cathode separator 30B respectively face the anode 22 and the cathode 23. The separators 30A and 30B are each formed by press-forming using a metal plate so as to produce a specific form. In the fuel cell stack S formed by stacking the unit cells 10 having the above-described structure, the separator 30A facing toward the anode 22 of one of any two adjacent unit cells 10 closely contacts the separator 30B facing toward the cathode 23 of the other unit cell 10.

In FIG. 2, at each upper-left corner of the membrane electrode assembly 20 and the separators 30A and 30B, a fuel gas supply hole 11 is provided, through which an unused fuel gas (e.g., hydrogen gas) flows. At each lower-right corner (i.e., the diagonal position of the above) of these elements, an anode off-gas discharge hole 12 is provided, through which an exhausted fuel gas (called an "anode off-gas" below) flows.

Similarly, at each upper-right corner of the membrane electrode assembly 20 and the separators 30A and 30B, an oxidant gas supply hole 13 is provided, through which an unused oxidant gas flows. At each lower-left corner (i.e., the diagonal position of the above) of these elements, a cathode off-gas discharge hole 14 is provided, through which an exhausted oxidant gas (called a "cathode off-gas" below) flows.

In addition, at each left end of the membrane electrode assembly 20 and the separators 30A and 30B, four cooling water supply holes 15a to 15d are aligned vertically, through which unused cooling water flows, and at each right end (i.e., the symmetrical position of the above) of these elements, four cooling water drainage holes 16a to 16d are aligned vertically, through which exhausted cooling water flows. The cooling water supply holes 15a to 15d and the cooling water drainage holes 16a to 16d are positioned lower than the fuel gas supply hole 11 and the anode off-gas discharge hole 12, and higher than the oxidant gas supply hole 13 and the cathode off-gas discharge hole 14.

Between the fuel gas supply hole 11 and the oxidant gas supply hole 13, and also between the anode off-gas discharge hole 12 and the cathode off-gas discharge hole 14, tie rod through-holes 17 are provided, through which tie rods for fastening the fuel cell stack S pass.

In each assembled unit cell 10 or the assembled fuel cell stack S, the fuel gas supply holes 11 of the membrane electrode assembly 20 and the separators 30A and 30B communicate with each other and form a distribution or collective passage via sealing parts 43 and 44 (explained later). Similarly, the anode off-gas discharge holes 12, the oxidant gas supply holes 13, the cathode off-gas discharge holes 14, the cooling water supply holes 15a to 15d, and the cooling water drainage holes 16a to 16d respectively form distribution or collective passages via the sealing parts 43 and 44 in each assembled unit cell 10 or the assembled fuel cell stack S. An end of each distribution passage (passing through the unit cells 10) also communicates with a corresponding hole (i.e., one of a fuel gas supply hole 91, an anode off-gas discharge holes 92, an oxidant gas supply holes 93, a cathode off-gas discharge hole 94, cooling water supply holes 95a to 95d, and cooling water drainage holes 96a to 96d) provided in an end plate 90A, and the other end thereof is closed by another end plate 90B. Similarly, on each of the upper and lower sides, the tie rod through-holes 17 also communicate with each other and with a tie rod through-hole 17 of the end plate 90A in each assembled unit cell 10 or the assembled fuel cell stack S via the sealing parts 43 and 44.

As shown in FIG. 1, unused cooling water is supplied and distributed from a cooling water supply manifold 81 to the cooling water supply holes 95a to 95d of the end plate 90A, and exhausted cooling water is drawn from the cooling water drainage holes 96a to 96d of the end plate 90A into a cooling water drainage manifold 82 so as to collectively drain the cooling water.

In addition, the fuel gas and the oxidant gas can also be respectively supplied from manifolds (not shown) to the fuel gas supply hole 91 and the oxidant gas supply hole 93, and the anode off-gas and the cathode off-gas, which are respectively discharged from the anode off-gas discharge holes 92 and the cathode off-gas discharge hole 94 can be discharged via manifolds (not shown).

Figure 3:
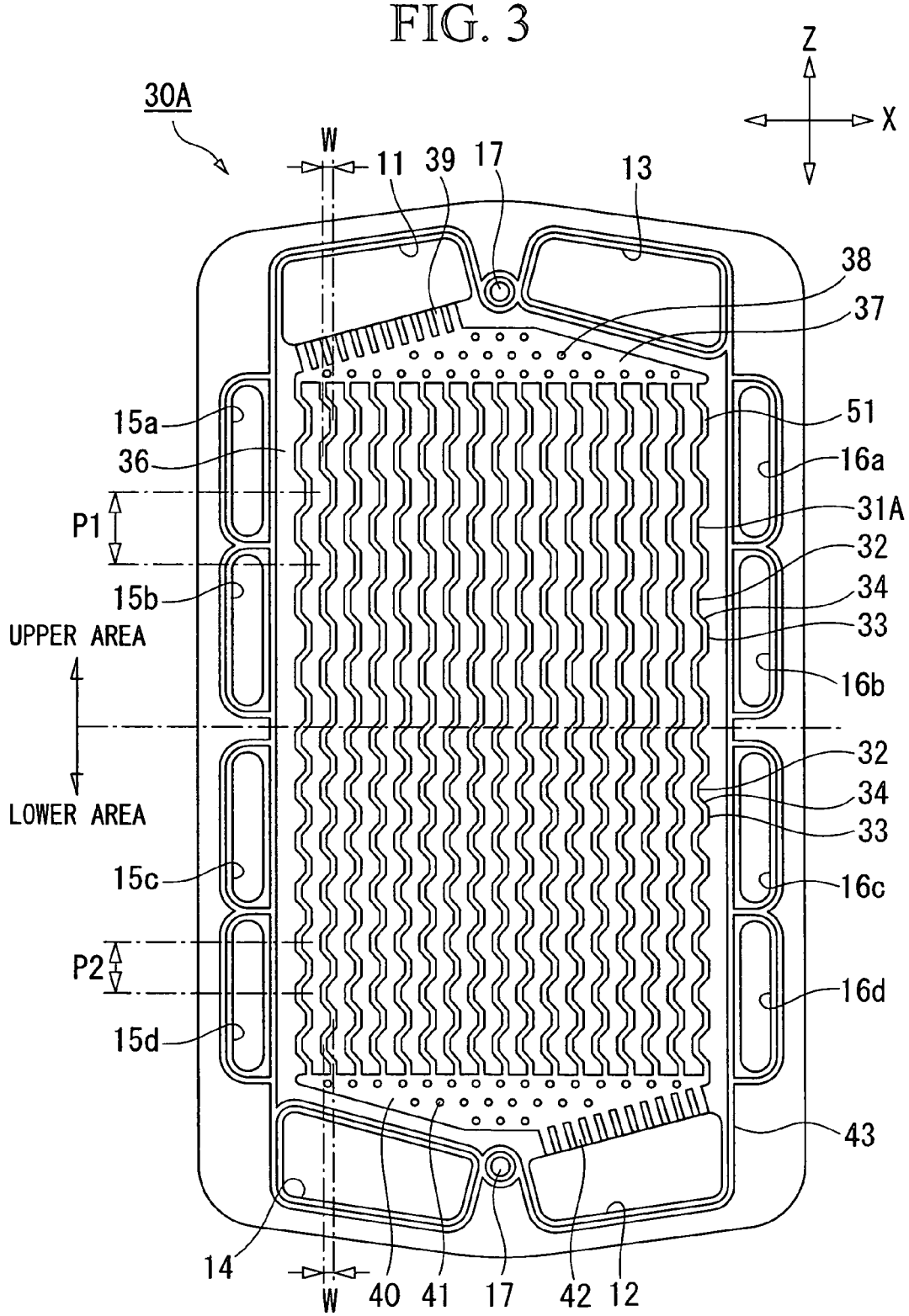
FIG. 3 is a front view of the anode separator as a constituent of the unit fuel cell.

As shown in FIG. 3, the anode separator 30A has a flat part 36, a surface of which contacts the membrane electrode assembly 20. In a rectangular area between the cooling water supply holes 15a to 15d and the cooling water drainage holes 16a to 16d, a plurality of protruding lines 31A are formed vertically along the length thereof, which protrude in the direction going away from the membrane electrode assembly 20. The protruding lines 31A are arranged in parallel at regular intervals in the horizontal (i.e., X) direction. As shown in FIG. 5, each protruding line 31A has a trapezoidal sectional shape having a flat peak 35, and ends of adjacent protruding lines 31A are joined to each other via the flat part 36.

Each protruding line 31A is arranged vertically in a zigzag form (so as to draw a substantially trapezoidal waveform). More specifically, one protruding line 31A has first straight portions 32 and second straight portions 33 which are arranged vertically in a zigzag form, and inclined parts 34, each being inclined with respect to the vertical direction in a manner such that adjacent first and second straight portions 32 and 33 interpose the inclined part 34. In the following explanation, reference symbol W indicates an amplitude of the protruding line 31A, which is a distance between the center of the first straight portions 32 and the center of the second straight portions 33 in the horizontal direction, and reference symbol P indicates a pitch of each protruding line 31A, which is a distance between center positions of adjacent first straight portions 32.

In the protruding line 31A, different pitches P are assigned to an upper area above the vertical center (i.e., the area including the cooling water supply holes 15a and 15b and the cooling water drainage holes 16a and 16b) and a lower area below the vertical center (i.e., the area including the cooling water supply holes 15c and 15d and the cooling water drainage holes 16c and 16d). Specifically, pitch P2 for the lower area is smaller than pitch P1 for the upper area. The lower and upper areas have the same amplitude W.

In the anode separator 30A, below the fuel gas supply hole 11 and the oxidant gas supply hole 13, an upper buffer 37 is formed, which protrudes in the direction going away from the membrane electrode assembly 20. In plan view, the upper buffer 37 has a trapezoidal shape having a longer lower side and a shorter upper side, and the upper end of each protruding line 31A is joined to the lower end of this upper buffer 37. The upper buffer 37 has a number of protrusions 38 separated from each other, each having a cylindrical shape and protruding toward the membrane electrode assembly 20. The top faces of the protrusions 38 are coplanar with the flat parts 36 of the anode separator 30A. In addition, the upper buffer 37 and the fuel gas supply hole 11 are joined to each other via a number of protruding lines 39 (other than the above protruding lines) which protrude in the direction going away from the membrane electrode assembly 20.

Also in the anode separator 30A, above the anode off-gas discharge hole 12 and the cathode off-gas discharge hole 14, a lower buffer 40 is formed, which protrudes in the direction going away from the membrane electrode assembly 20. In plan view, the upper buffer 37 has a trapezoidal shape having a longer upper side and a shorter lower side, and the lower end of each protruding line 31A is joined to the upper end of this lower buffer 40. The lower buffer 40 has protrusions 41 separated from each other, each having a cylindrical shape and protruding toward the membrane electrode assembly 20. The top faces of the protrusions 41 are coplanar with the flat parts 36 of the anode separator 30A. In addition, the lower buffer 40 and the anode off-gas discharge hole 12 are joined to each other via a number of protruding lines 42 which protrude in the direction going away from the membrane electrode assembly 20.

On the surface of the anode separator 30A, which closely contacts the membrane electrode assembly 20, a sealing part 43 made of an insulating material (e.g., silicone resin) is provided. The sealing part 43 is arranged so as to collectively surround the outside of the fuel gas supply hole 11, the anode off-gas discharge hole 12, the upper buffer 37, the lower buffer 40, and all protruding lines 31A, 39, and 42, and also to individually surround the oxidant gas supply hole 13, the cathode off-gas discharge hole 14, each of the cooling water supply holes 15a to 15d, each of the cooling water drainage holes 16a to 16d, and each tie rod through hole 17.

The anode separator 30A is attached in a manner such that the flat parts 36 and the sealing part 43 closely contact the anode 22 of the membrane electrode assembly 20, and the space formed between the membrane electrode assembly 20 and the upper buffer 37, the space formed between the membrane electrode assembly 20 and the lower buffer 40, and the spaces formed between the membrane electrode assembly 20 and the protruding lines 31A, 39, and 42 function as an anode gas passage 51 through which the fuel gas flows. Therefore, the fuel gas drawn into the anode gas passage 51 from the fuel gas supply hole 11 passes through the protruding lines 39, the upper buffer 37, the protruding lines 31A, the lower buffer 40, and the protruding lines 42, and is then discharged from the anode off-gas discharge hole 12. That is, the fuel gas flows along the anode 22 of the membrane electrode assembly 20 vertically from the upper side to the lower side in a zigzag manner.

In this process, as the upper buffer 37 has the trapezoidal shape whose lower side is longer than the upper side and has a number of protrusions 38, the fuel gas drawn from the fuel gas supply hole 11 into the upper buffer 37 can be diffused and distributed substantially uniformly to all protruding lines 31A. Additionally, as the lower buffer 40 has the trapezoidal shape whose upper side is longer than the lower side and also has a number of protrusions 41, the flow of the anode off-gas drawn from the protruding lines 31A into the lower buffer 40 can be shaped and collectively supplied to the anode off-gas discharge hole 12.

Figure 4:
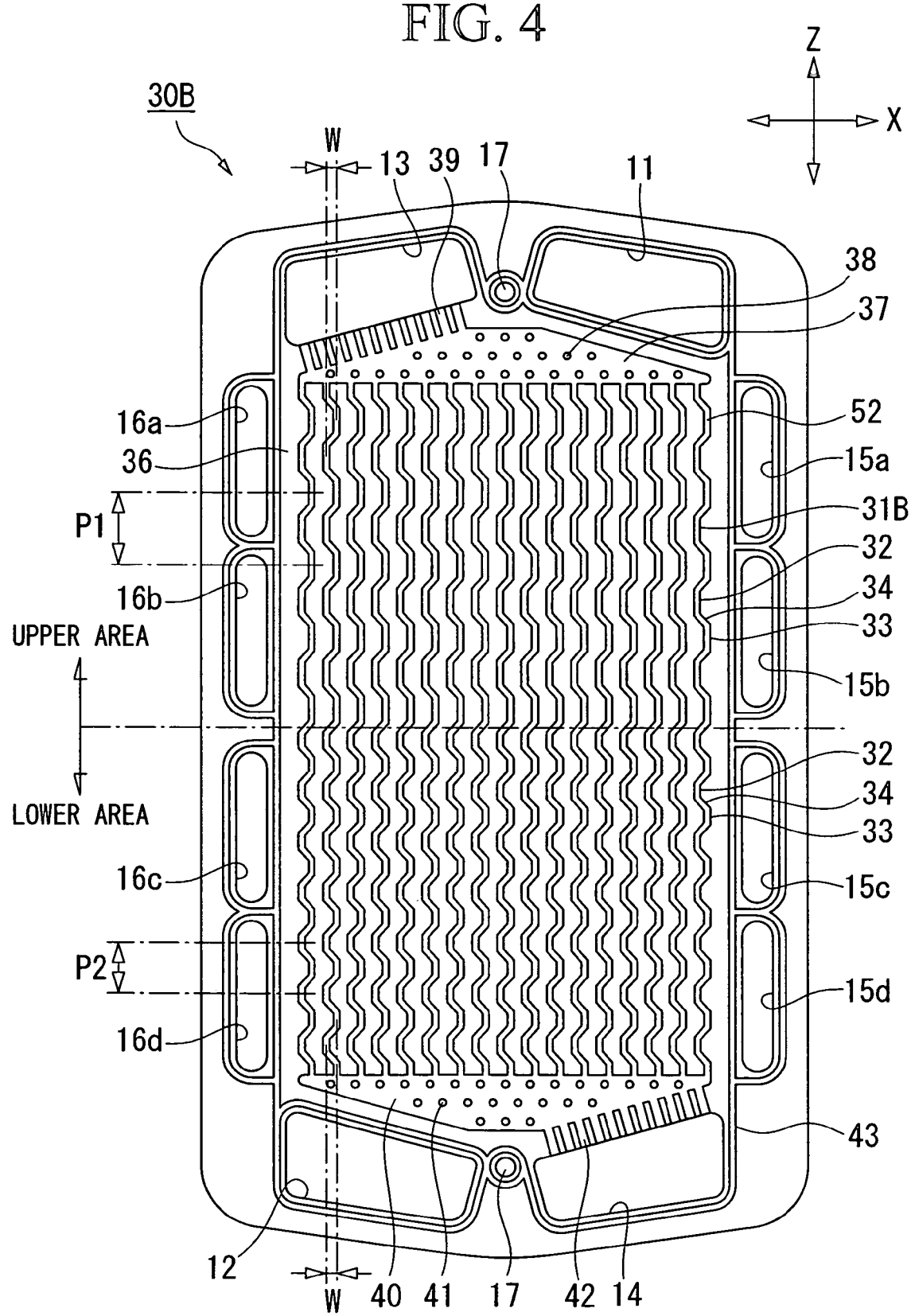
FIG. 4 is a front view of the cathode separator as a constituent of the unit fuel cell.

The cathode separator 30B has substantially the same structure as that of the anode separator 30A; thus, explanations of the parts of the cathode separator 30B identical to those of the anode separator 30A are omitted, and only distinctive parts will be explained with reference to FIG. 4. FIG. 4 shows the cathode separator 30B viewed from the side facing the cathode 23.

As shown in FIG. 2, when viewing from the same side, there is a phase difference between protruding lines 31B of the cathode separator 30B and the protruding lines 31A of the anode separator 30A. If it is assumed that each protruding line draws a sinusoidal waveform, the phase difference is 180°.

Also with respect to the protruding lines 31B, the pitch P1 assigned to the upper area above the vertical center is larger than the pitch P2 assigned to the lower area below the vertical center, and the upper and lower areas have the same amplitude W.

In the cathode separator 301B, the upper buffer 37 is joined to the oxidant gas supply hole 13 via the protruding lines 39, and the lower buffer 40 is joined to the cathode off-gas discharge hole 14 via the protruding lines 42.

The sealing part 43 of the cathode separator 30B is arranged so as to collectively surround the outside of the oxidant gas supply hole 13, the cathode off-gas discharge hole 14, the upper buffer 37, the lower buffer 40, and all protruding lines 31A, 39, and 42, and also to individually surround the fuel gas supply hole 11, the anode off-gas discharge hole 12, each of the cooling water supply holes 15a to 15d, each of the cooling water drainage holes 16a to 16d, and each tie rod through hole 17.

The cathode separator 30B is attached in a manner such that the flat parts 36 and the sealing part 43 closely contact the cathode 23 of the membrane electrode assembly 20, and the space formed between the membrane electrode assembly 20 and the upper buffer 37, the space formed between the membrane electrode assembly 20 and the lower buffer 40, and the spaces formed between the membrane electrode assembly 20 and the protruding lines 31A, 39, and 42 function as a cathode gas passage 52 through which the oxidant gas flows. Therefore, the oxidant gas drawn into the cathode gas passage 52 from the oxidant gas supply hole 13 passes through the protruding lines 39, the upper buffer 37, the protruding lines 31B, the lower buffer 40, and the protruding lines 42, and is then discharged from the cathode off-gas discharge hole 14. That is, the oxidant gas flows along the cathode 23 of the membrane electrode assembly 20 vertically from the upper side to the lower side in a zigzag manner.

In this process, as the upper buffer 37 has the trapezoidal shape whose lower side is longer than the upper side and also has a number of protrusions 38, the oxidant gas drawn from the oxidant gas supply hole 13 into the upper buffer 37 can be diffused and distributed substantially uniformly to all protruding lines 31B. Additionally, as the lower buffer 40 has the trapezoidal shape whose upper side is longer than the lower side and also has a number of protrusions 41, the flow of the cathode off-gas drawn from the protruding lines 31B into the lower buffer 40 can be shaped and collectively supplied to the cathode off-gas discharge hole 14.

As shown by the alternate long and two short dashed line in FIG. 2, in the fuel cell stack S, the area where the protruding lines 31A of the anode separator 30A and the protruding lines 31B of the cathode separator 30B are formed functions as an actual power generation area G.

As shown in FIG. 2, a sealing part 44 made of an insulating material (e.g., silicone resin) is also provided on the back face of the cathode separator 30B (i.e., the opposite face of the face which closely contacts the membrane electrode assembly 20). The sealing part 44 is arranged so as to collectively surround the outside of the cooling water supply holes 15a to 15d and the cooling water drainage holes 16a to 16d, and also to individually surround the fuel gas supply hole 11, the anode off-gas discharge hole 12, the oxidant gas supply hole 13, the cathode off-gas discharge hole 14, and each tie rod through hole 17. Similar to the cathode separator 30B, a sealing part 44 is also provided on the back face of the anode separator 30A (i.e., the opposite face of the face which closely contacts the membrane electrode assembly 20).

As discussed above, in the fuel cell stack S formed by stacking the unit cells 10, the anode separator 30A of one of adjacent unit cells 10 closely contacts the cathode separator 30B of the other separator. More specifically, (i) the peaks 35 of the first straight portions 32 belonging to the protruding lines 31A of the anode separator 30A closely contact the peaks 35 of the first straight portions 32 belonging to the corresponding protruding lines 31B of the cathode separator 30B, (ii) the upper buffer 37 and the lower buffer 40 of the anode separator 30A respectively closely contact the upper buffer 37 and the lower buffer 40 of the cathode separator 30B, and (iii) the sealing part 44 of the anode separator 30A closely contacts the sealing part 44 of the cathode separator 30B. Accordingly, in a space surrounded by both sealing parts 44 (which contact each other) which is formed between the separators 30A and 30B, and also between the upper buffers 37 and the lower buffers 40, a cooling water passage 53 (i.e., a coolant passage) is formed in an area which includes the cooling water supply holes 15a to 15d, the cooling water drainage holes 16a to 16d, and the protruding lines 31A and 31B. No cooling water flows between the upper buffers 37, and also between the lower buffers 40; therefore, it is possible to efficiently distribute a coolant to the power generation area G, and thus to efficiently cool the power generation area G.

Figure 6:
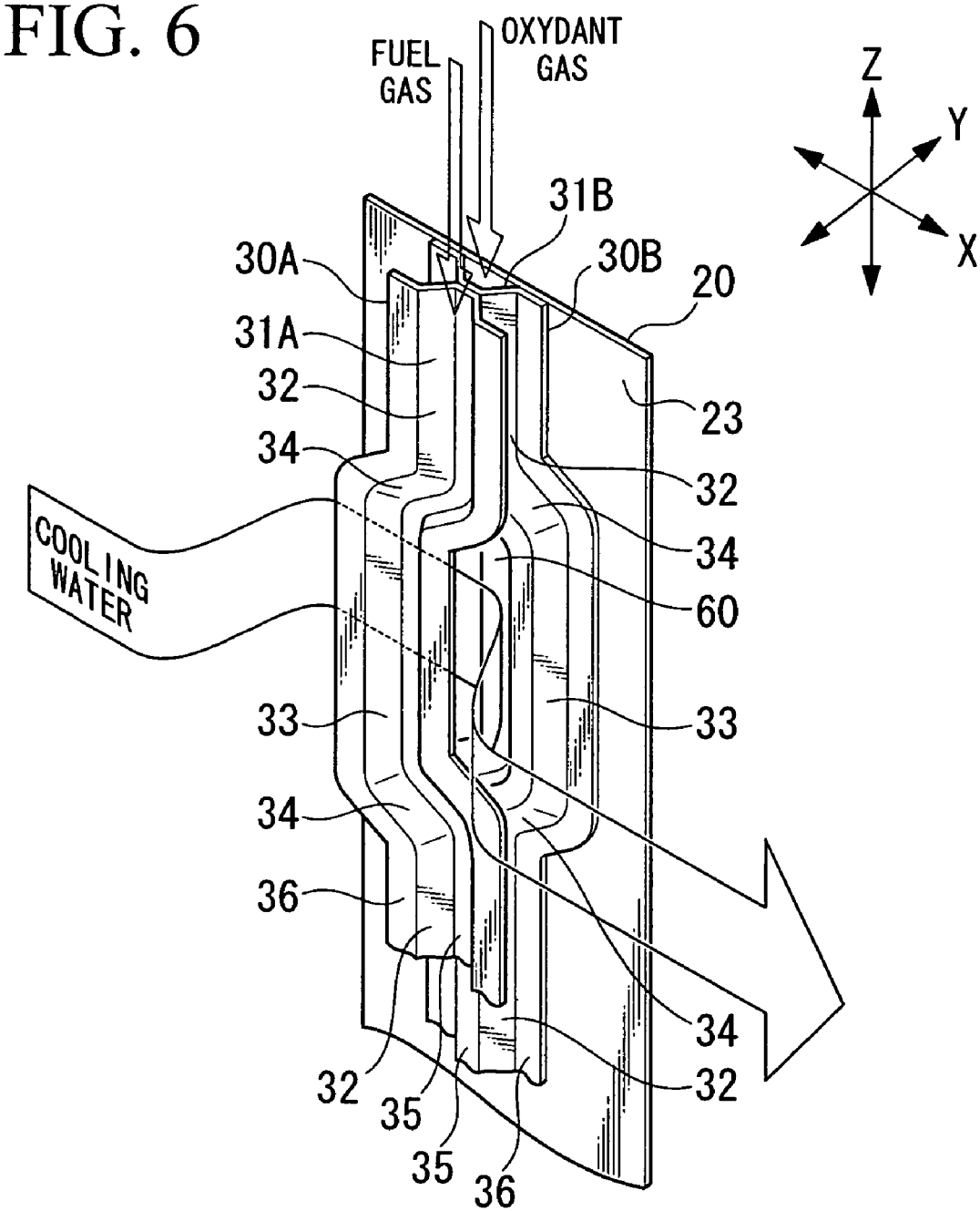
FIG. 6 is a perspective view showing the stacking state of the separators in the fuel cell stack.
Figure 7:
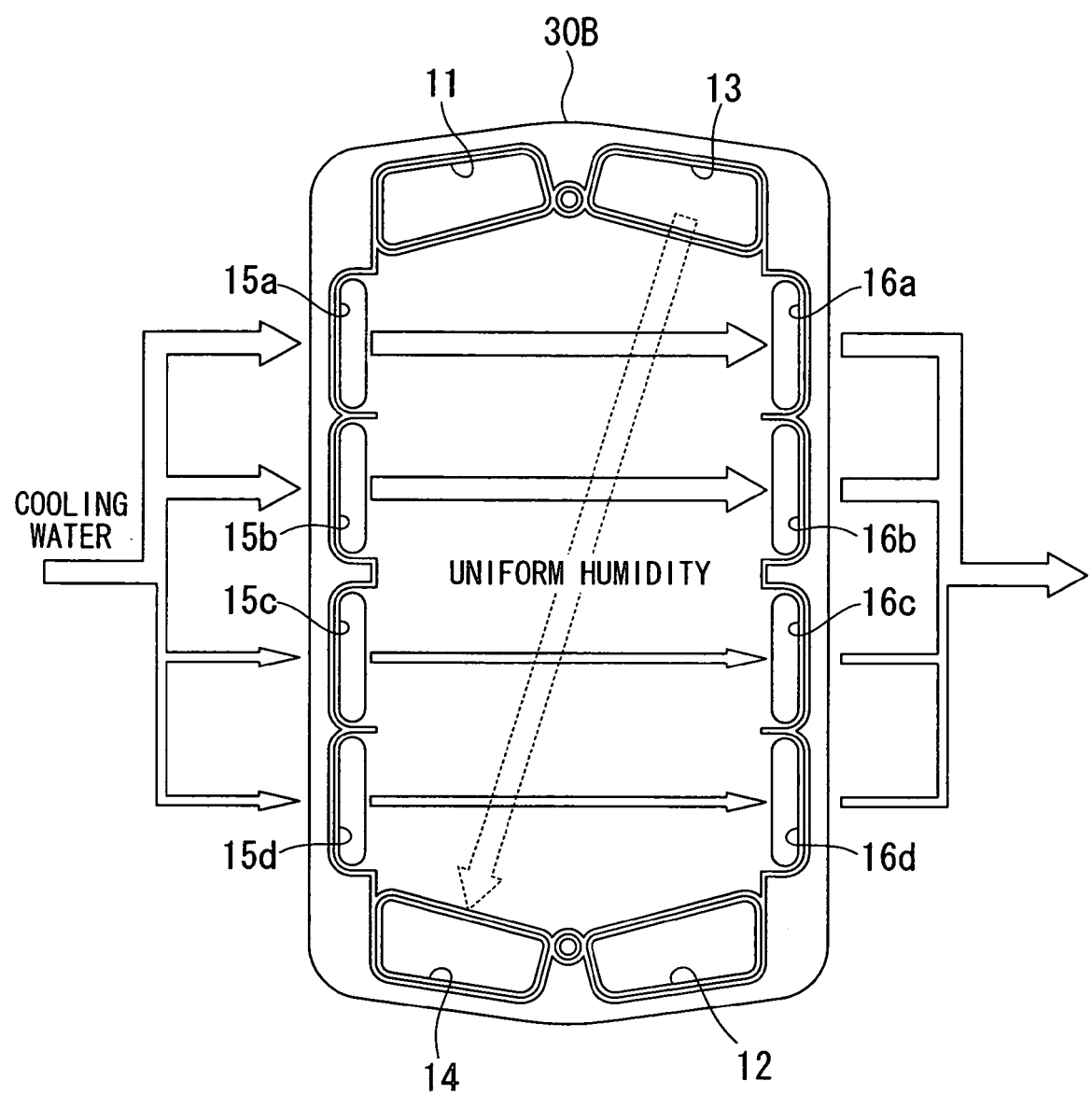
FIG. 7 is a schematic diagram showing the state of humidity in the fuel cell stack.
Figure 8:
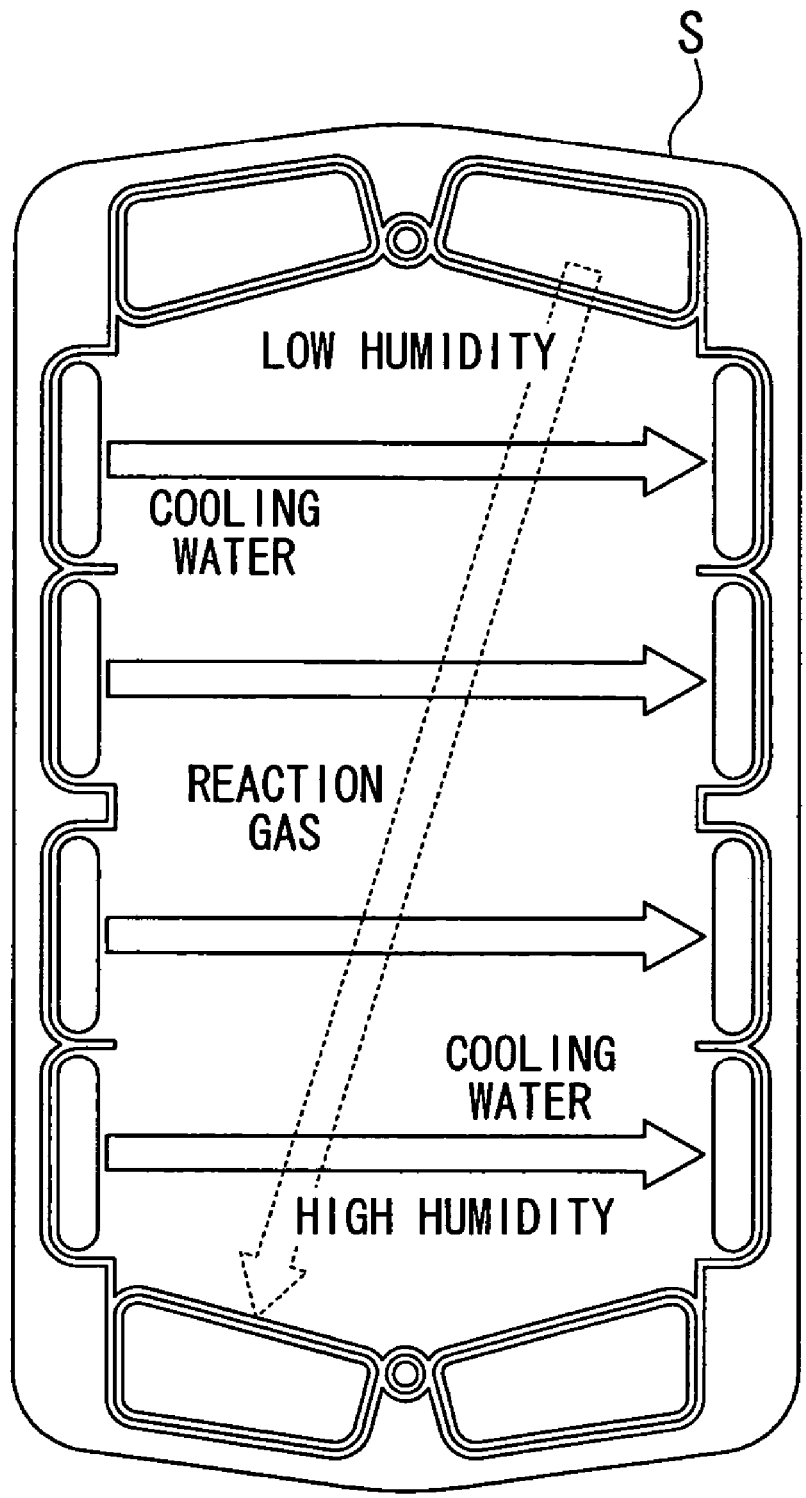
FIG. 8 is a schematic diagram showing the state of humidity in a fuel cell stack as a comparative example.

The cooling water passage 53 will be explained in more detail with reference to FIGS. 5 and 6. FIG. 6 shows representatively one of the protruding lines 31A of the anode separator 30A and corresponding one of the protruding lines 31B of the cathode separator 30B.

As described above, there is a phase difference between the protruding lines 31A of the anode separator 30A and the protruding lines 31B of the cathode separator 30B. Therefore, when the peaks 35 of the first straight portions 32 belonging to each protruding line 31A are overlapped in close contact with the peaks 35 of the first straight portions 32 belonging to the corresponding protruding line 31B, the peaks 35 of the second straight portions 33 of the above protruding line 31A do not overlap with the peaks 35 of the second straight portions 33 of the above protruding line 31B, and are separated from each other in the horizontal direction, and openings 60 are formed therebetween.

In addition, the peaks of the second straight portions 33 belonging to each protruding line 31A of the anode separator 30A face but are separated from the corresponding flat part 36 of the cathode separator 30B, and similarly, the peaks of the second straight portions 33 belonging to the corresponding protruding line 31B of the cathode separator 30B face but are separated from the corresponding flat part 36 of the anode separator 30A. Therefore, the cooling water passage 53 formed between the anode separator 30A and the cathode separator 30B is (i) blocked horizontally where the first straight portions 32 of the protruding lines 31A and 3B are overlapped with each other, and (ii) opened horizontally where the second straight portions 33 of the protruding lines 31A and 3B are present.

Accordingly, the cooling water drawn from the cooling water supply holes 15a to 15d into the cooling water passage 53 flows horizontally toward the corresponding cooling water drainage holes 16a to 16d in a manner such that it threads between the second straight portions 33 of the protruding lines 31A and 3B. That is, in contrast with the fuel gas and the oxidant gas which flow vertically, the cooling water flows in the horizontal direction perpendicular to the flowing direction of these reaction gases.

As discussed above, in the protruding lines 31A and 31B, the pitch P2 of the lower area is smaller than the pitch P1 of the upper area. Therefore, the area of each opening 60 formed between the second straight portions 33 of the protruding lines 31A and 31B in the lower area is smaller than the area of each opening 60 formed between the second straight portions 33 of the protruding lines 31A and 31B in the upper area. Accordingly, with respect to the cooling water passage 53, the lower area has a larger flow resistance than that of the upper area.

In the fuel cell stack S and also in each unit cell 10 as configured above, hydrogen ions generated at the anode 22 by catalytic reaction move through the solid polymer electrolyte membrane 21 to the cathode 23, and an electrochemical reaction occurs between the hydrogen ions and oxygen at the cathode 23, thereby generating electric power. In this process, water is also generated. The cooling water flowing through the cooling water passage 53 is used for removing heat of the unit cell 10 (i.e., for cooling the unit cell 10) so that the temperature of the unit cell 10 does not exceed a specific working temperature by the heat generated in accordance with the electric power generation.

In the fuel cell stack S, the reaction gases (i.e., the fuel gas and the oxidant gas) flow downward vertically from the upper side to the lower side (i.e., in the gravitational direction) along the membrane electrode assembly 20; thus, the above reaction also proceeds from the upper side to the lower side, and the generated water accompanied with the reaction also flows through the fuel gas passage 51 and the oxidant gas passage 52 (which may be collectively called "reaction gas passages 51 and 52" below) from the upper side to the lower side. Therefore, a lower portion of the reaction gas passages 51 and 52 includes a larger amount of water in comparison with an upper portion thereof.

However, in this fuel cell stack S, as discussed above, the pitch P2 of the lower area of the protruding lines 31A and 31B is smaller than the pitch P1 of the upper area thereof; thus, the lower area has a larger flow resistance than that of the upper area. Accordingly, the cooling water can more easily flow in the upper area in comparison with the lower area, thereby reducing the amount of cooling water flowing through the lower area. As a result, the lower area can be less cooled in comparison with the upper area, and the temperature of the lower area including a larger amount of water in the reaction gas passages 51 and 52 can be higher than that of the upper area including a smaller amount of water in the reaction gas passages 51 and 52. Therefore, the relative humidity in the reaction gas passages 51 and 52 in the lower area can be reduced and substantially equal to that in the reaction gas passages 51 and 52 in the upper area. Accordingly, it is possible to provide a substantially uniform relative humidity over the whole plane of the membrane electrode assembly 20 (see FIG. 7).

In addition, as the pitch P2 of the lower area of the protruding lines 31A and 31B is smaller than the pitch P1 of the upper area thereof, the lower area has a larger flow resistance of the reaction gas passages 51 and 52 in comparison with the upper area. Therefore, the pressure of the reaction gases in the lower area can be reduced, and can be saturated partial pressure of water vapor or lower; thus, water (e.g., the generated water as described above) existing in the reaction gas passages 51 and 52 of the lower area can be vaporized and discharged from the reaction gas passages 51 and 52 together with the reaction gases.

Accordingly, electric power generation can be performed uniformly over the whole plane of the membrane electrode assembly 20, thereby performing stable power generation. In addition, it is possible to prevent the membrane electrode assembly 20 from flooding, and also to prevent the reaction gas passages 51 and 52 from being closed or blocked due to the generated water.

In particular, in the present embodiment, the cooling water supply holes 15a and 15b and the cooling water drainage holes 16a and 16b are assigned to the upper area of the cooling water passage 53, and the cooling water supply holes 15c and 15d and the cooling water drainage holes 16c and 16d are assigned to the lower area of the cooling water passage 53. Therefore, it is possible to reliably distribute the cooling water to the upper and lower areas.

Other Embodiments

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

For example, in the above-described embodiment, the coolant passage is provided between every adjacent unit cell 10. However, the coolant passage may be intermittently formed. In this case, no coolant passage is provided between some adjacent unit cells 10, and a single separator is commonly used between these unit cells 10. This single separator functions as the separator toward the anode at one of the unit cells 10, and as the separator toward the cathode at the other unit cell 10.

In addition, the waveform of each protruding line is not limited to a trapezoidal waveform, and various waveforms such as a sine waveform may be employed.

In the present invention, the upper area of the protruding lines means an area positioned upper with respect to the lower area. In the above embodiment, the coolant passage (i.e., the protruding lines) is divided into two areas, that is, the upper and lower areas; however, it may be divided into three or more areas so that the lower the position of the area, the larger the flow resistance (i.e., the smaller the pitch of the waves of the protruding line).

What is claimed is:

1. A fuel cell stack comprising a plurality of stacked unit fuel cells, wherein:
   each unit fuel cell has:
   a membrane electrode assembly in which an anode and a cathode interpose an electrolyte membrane; and
   a pair of separators, each made of a metal plate, which respectively closely contact the anode and the cathode, wherein each separator has a plurality of protruding lines which are arranged vertically in a zigzag manner so as to draw a waveform, and which protrude in a direction going away from the membrane electrode assembly;
   a space between the anode and the protruding lines of the separator which closely contacts this anode is used as a fuel gas passage through which a fuel gas flows;
   a space between the cathode and the protruding lines of the separator which closely contacts this cathode is used as an oxidant gas passage through which an oxidant gas flows;
   at least part of the separators are each arranged in close contact with another separator so that a coolant passage through which a coolant flows horizontally is formed between both separators in a manner such that the coolant passage crosses the fuel gas passage and the oxidant gas passage, the coolant passage having a lower coolant passage area formed on a back side of a lower portion of the gas passages and a upper coolant passage area on a back side of an upper portion of the gas passages, wherein the fuel gas passage, the oxidant gas passage, and the membrane electrode assembly has a lower portion corresponding to the lower coolant passage area and an upper portion corresponding to the upper coolant passage are, and
   in the coolant passage, a distance between corresponding points of adjacent waves of the waveform of the protruding lines forms a pitch, and the pitch is smaller in the lower coolant passage area than in the upper coolant passage area, such that the lower coolant passage area has a larger flow resistance than that of the upper coolant passage area in order to cool the lower portion of the fuel gas passage, the oxidant gas passage and the membrane electrode assembly less than the upper portion of the fuel gas passage, the oxidant gas passage, and the membrane electrode assembly.

2. The fuel cell stack in accordance with claim 1, wherein the upper and lower coolant passage areas each have an individual hole for supplying the coolant into the respective coolant passage area and an individual hole for draining the coolant drawn from the respective coolant passage area.

3. The fuel cell stack in accordance with claim 1, wherein the upper and lower coolant passage areas each have an individual hole for supplying the coolant into the respective coolant passage area and an individual hole for draining the coolant drawn from the respective coolant passage area.

4. The fuel cell stack in accordance with claim 1, wherein the lower coolant passage area is lower in a gravitational direction.

* * * * *